(No Model.)
J. WITTEMANN.
CHOPPING BLOCK.
No. 556,120.  Patented Mar. 10, 1896.
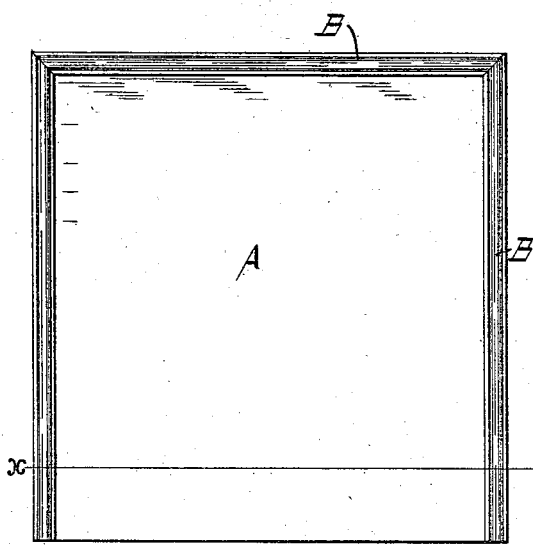
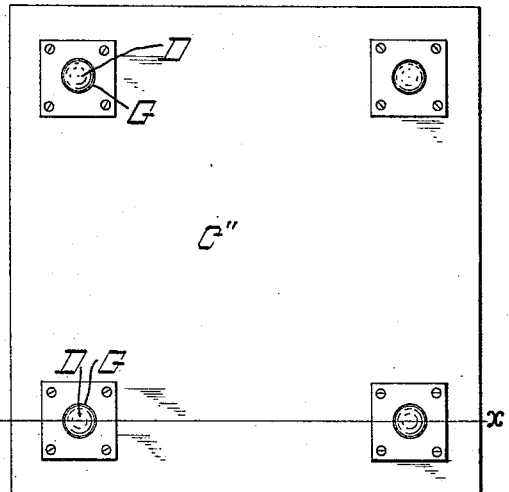
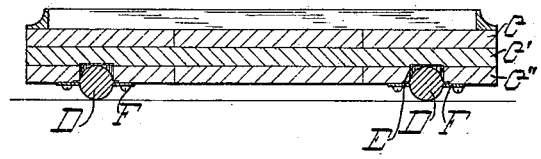
Witnesses:
Ferd N. Otto.
O. L. Roesch.
Inventor
John Wittemann
By Erwin Wheeler & Wheeler
Attorneys.

UNITED STATES PATENT OFFICE.

JOHN WITTEMANN, OF MILWAUKEE, WISCONSIN.

CHOPPING-BLOCK.

SPECIFICATION forming part of Letters Patent No. 556,120, dated March 10, 1896.

Application filed July 10, 1895. Serial No. 555,479. (No model.)

*To all whom it may concern:*

Be it known that I, JOHN WITTEMANN, a citizen of the United States, residing at Milwaukee, in the county of Milwaukee and State of Wisconsin, have invented new and useful Improvements in Chopping-Blocks, of which the following is a specification.

My invention relates to improvements in chopping-blocks for household use.

The object of my invention is to provide an elastic cushion or support for the block, adapted to prevent the noise and jar heretofore incident to this kind of work.

In the drawings, Figure 1 is a top view of my chopping-block. Fig. 2 is a bottom view of the same. Fig. 3 is a sectional view drawn on the line X X of Figs. 1 and 2.

Reference-letters are applied consistently in the several views.

A is the top or chopping surface of my chopping-block.

B is a raised molding surrounding three sides of the block and adapted to retain the chopped material thereon. To prevent splitting the block is preferably formed of two or more wooden layers C, C', and C'', each layer being disposed with the grain of the wood at right angles to that of the adjacent layers and the several layers being glued or otherwise fastened together.

Rubber balls D are adapted to be inserted in recesses E in the under surface of the block, the recesses being of sufficient depth to receive slightly more than one-half of the ball. Each ball is held in its respective recess by a plate F, provided with a circular opening G, through which the projecting portion of the ball is adapted to fit. The plates being screwed or tacked to the block and the openings G being of less diameter than that of the balls it is obvious that the balls are held in the recesses by the plates, while that portion which projects through the openings forms an elastic cushion upon which the block is supported.

The recesses E are preferably formed with vertical sides or made slightly larger than the balls, thus permitting the upper half of the balls to expand under pressure and forming a double cushion.

I am aware that elastic cushions have heretofore been attached to the legs and backs of chairs in order to keep them from scratching or marring the floor and wainscoting or plastered walls, and I do not claim to be the first to use a rubber cushion for such purposes, having expressly limited my claim to the invention of a specific article of manufacture in which the rubber cushions are adapted merely to relieve the pound and jolt caused by the chopping-knife.

Having thus described my invention, what I claim as new, and desire to secure by Letters Patent, is—

As an article of manufacture, a chopping-block consisting of the combination of the wooden block provided with recesses in its under surface, and the rubber balls of less diameter than said recesses partially inserted therein, together with the apertured metallic plates for holding said balls in said recesses with a portion projecting therefrom, substantially as described.

In testimony whereof I affix my signature in the presence of two witnesses.

JOHN WITTEMANN.

Witnesses:
STANLEY C. WHEELER,
LEVERETT C. WHEELER.